United States Patent
Flenker et al.

[19]

[11] Patent Number: 5,915,481
[45] Date of Patent: Jun. 29, 1999

[54] TILLAGE IMPLEMENT WITH ON THE GO ANGLE AND DEPTH CONTROLLED DISCS

[76] Inventors: Kevin P. Flenker, 203 W. 1st St.; William Flenker, 29476 240th Ave., both of Long Grove, Iowa 52756; Kim W. Flenker, 24739 257th St., Princeton, Iowa 52768

[*] Notice: This patent is subject to a terminal disclaimer.

[21] Appl. No.: 09/003,896

[22] Filed: Jan. 7, 1998

Related U.S. Application Data

[63] Continuation-in-part of application No. 08/889,488, Jul. 8, 1997, Pat. No. 5,878,821.

[51] Int. Cl.⁶ .................................................... A01B 5/00
[52] U.S. Cl. ......................... 172/166; 172/454; 172/584; 172/569
[58] Field of Search .................................. 172/166, 567, 172/569, 576, 579, 584, 586, 603, 618, 454

[56] References Cited

U.S. PATENT DOCUMENTS

| | | |
|---|---|---|
| 508,028 | 11/1893 | Leineweber . |
| 631,498 | 8/1899 | Clark .................................. 172/576 X |
| 633,465 | 9/1899 | Mertes . |
| 1,026,912 | 5/1912 | Hardt . |
| 1,047,921 | 12/1912 | Dins . |
| 2,600,854 | 6/1952 | Cross . |
| 2,727,453 | 12/1955 | Altgelt . |
| 3,675,725 | 7/1972 | Schultz . |
| 4,454,920 | 6/1984 | Dietrich, Sr. . |
| 5,078,216 | 1/1992 | Dick . |
| 5,080,178 | 1/1992 | Dietrich, Sr. ......................... 172/574 X |
| 5,207,279 | 5/1993 | Nelson et al. . |
| 5,458,203 | 10/1995 | Evers . |
| 5,462,123 | 10/1995 | Harlen et al. . |

OTHER PUBLICATIONS

Sunflower—Series 4000, Deep Tillage brochure (No Date).
DMI—Helping Plants Thrive Through Primary Tillage brochure (No Date).

*Primary Examiner*—Thomas B. Will
*Assistant Examiner*—Robert Pezzuto
*Attorney, Agent, or Firm*—Henderson & Sturm

[57] ABSTRACT

A tillage implement adapted to be towed by a tractor. The tillage implement having on-the-go angle adjustable disc blades which enables the farmer to vary the amount of crop residue left on the surface of the soil. The implement is comprised of a main frame, a ground wheel assembly operably and pivotally connected to the main frame, a first actuator for pivotally raising and lower the ground wheel assembly with respect to the main frame. The tillage implement further comprising a plurality of disc blade assemblies, the disc blade assemblies arranged as a disc gang. The disc gang being pivotally connected to the main frame such that a second actuator can act to raise and lower the disc gang with respect to the main frame. Each of the disc blade assemblies having first and second disc blades rotatably mounted on disc blade axles fixed to first and second interlocking members. Whereby activation of a third actuator operably connected to the main frame and one of the interlocking members of each disc assembly causes rotation the first and second disc blades such that the angular orientation of the disc blades with respect to the direction of travel of the implement is adjustable while on-the-go to vary the amount of crop residue left on the surface of the soil. The main frame of the tillage implement may further support a plurality of deep tillage shanks. Each of the shanks are positioned rearwardly and longitudinally in line with one of the plurality of disc blade assemblies of the disc gang.

13 Claims, 6 Drawing Sheets

TILLAGE IMPLEMENT WITH ON THE GO ANGLE AND DEPTH CONTROLLED DISCS

CROSS-REFERENCE TO RELATED APPLICATIONS

This application is a Continuation-in-Part of application Ser. No. 08/889,488, filed Jul. 8, 1997, now U.S. Pat. No. 5,878,821, the disclosure of which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

This invention relates to tillage implements, and more particularly to a tillage implement with on-the-go angle adjustable disc blades.

2. Description of the Related Art

Modern tillage implements are generally comprised of a wheeled frame assembly which supports a combination of tillage tools so as to accomplish one or more tillage tasks on each pass of the implement. One of the tillage tools typically found on tillage implements are disc blades. Disc blades are used primarily to cut or chop crop residue on the surface of the soil and mix the residue into the soil as the disc blades pass through the field.

Most conventional implements which utilize disc blades usually have the disc blades arranged in one or more disc gangs. Disc gangs are merely a plurality of spaced apart disc blades attached to a support beam that is in turn connected to the main frame of the implement. The individual disc blades of the disc gang are usually oriented in the same direction and the disc gangs are typically set at an oblique angle to the direction of travel of the implement. This oblique angle of the disc gangs allows the disc blades to better cut and mix the crop residue into the soil. In many conventional tillage implements, the disc gangs are arranged in an "X" configuration with the trailing half of the X configuration having the disc blades oriented in the opposite direction as the leading half of the X configuration. The purpose of the X configuration is to provide for better mixing of the crop residue into the soil and to more evenly level the soil surface.

It should be appreciated that changing the oblique angle of the disc gangs will vary the amount of residue being turned over and worked into the soil. It is often desirable to vary the amount of crop residue left on the surface of the soil in different areas of the field. For example, in areas of a field subject to more severe wind or water erosion, it is desirable, and often required by soil conservation boards, to leave more crop residue on the soil surface to minimize soil erosion. Alternatively, in areas of a field not subject to wind or water erosion, it is desirable to have less crop residue on the soil surface and more of the crop residue turned over into the soil.

Heretofore, few implements allowed the oblique angle of the disc gangs to be varied in order to control the amount of crop residue left on the surface of the soil. One prior art implement which does allow for varying the oblique angle of its disc gangs is disclosed in U.S. Pat. No. 5,462,123 issued to Harlan et al. (Harlan '123). Unfortunately, changing the oblique angle of the Harlan '123 implement, requires the disc blades to be out of the soil. Thus the oblique angle of the disc gangs can not be adjusted while on-the-go. Therefore, there is a need in the industry for a disc implement with discs that can be adjusted while on-the-go to vary the amount of crop residue left on the surface of the soil.

Additionally, in recent years, use of deep tillage implements has become increasingly more popular. Deep tillage implements are used to break up the "hard-pan" or soil compaction layer in the fields. Soil compaction often results in water ponding in the fields and reduces crop yield. Soil compaction is a common problem in many fields and can be caused by repetitive tillage at the same depth by the same implement, working the soil in wet conditions, numerous trips by heavy equipment, heavy rains, and/or lack of crop rotation.

One common problem when using deep tillage tools on fields with a high percentage of crop residue on the surface is plugging of the deep tillage shanks. For example, when using a deep tillage implement on a corn field, the corn stalk residue often gets wrapped around the deep till shanks. As more and more stalks wrap around the shanks as the implement passes over the field, the shanks become so entangled with stalks that the crop residue no longer flows between the spaced apart shanks. Therefore, the implement must be raised out of the soil to remove the entangled stalks from the shanks, resulting in significant down time.

In an attempt to minimize plugging of the shanks, most deep tillage implements now have at least one set of disc gangs preceding the deep till shanks. The discs are intended to cut or chop the crop residue in smaller pieces before the residue encounters the deep till shanks. Many deep tillage implements use two sets of oppositely oriented disc gangs before the deep till shanks, wherein the disc blades of the rearward disc gangs are oriented in the opposite direction as the disc blades of the forward disc gang. One type of such implement is the Ecolo-Tiger implement series sold by DMI. Although orienting the forward and rearward disc gangs in such a manner is an improvement over the single disc gang arrangement in that it minimizes plugging of the deep till shanks, the farmers are still left with the same problems as discussed above, that being, the inability to change the oblique angle of the discs blades while on-the-go to vary the amount of crop residue on the surface or the soil. Thus there is a need in the industry for a deep tillage implement that takes advantage of the oppositely oriented disc blade arrangement discussed immediately above in order to minimize plugging of the deep till shanks, but yet allows the farmer to adjust the oblique angle of the disc blades while on-the-go in order to vary the amount of crop residue left on the surface of the soil.

BRIEF SUMMARY OF THE INVENTION

The present invention relates to a tillage implement for attachment to a tractor for towing across a field to be tilled. The tillage implement has on-the-go angle adjustable disc blades which enables the farmer to vary the amount of crop residue left on the surface of the soil.

The implement is comprised of a main frame adapted to be towed by a tractor. A ground wheel assembly is operably and pivotally connected to the main frame. A first actuator acts to pivot the ground wheel assembly with respect to the main frame, thereby raising and lowering the main frame with respect to the ground surface. The tillage implement further comprises a plurality of disc blade assemblies. The disc blade assemblies are arranged as a disc gang. The disc gang is pivotally connected to the main frame, and a second actuator acts to pivotally raise and lower the disc gang with respect to the main frame, thereby changing the working depth of the disc blades.

Each of the disc blade assemblies of the disc gang have first and second disc blades that are angularly adjustable relative to one another and to the direction of travel of the tractor and implement while on-the-go. The on-the-go adjustment of the disc blades is accomplished by first and second interlocking members which rotatably support the disc blades on first and second disc blade axles. A bar extending substantially transverse to the direction of travel of the implement is pivotally connected to linking members attached to one of the interlocking members of each disc blade assembly. A third actuator operably connected at one end to the main frame and at another end to the transverse bar, acts to move the bar transversely to the direction of travel of the implement, thereby causing rotation of the first and second interlocking members connected thereto by the link, thereby changing the angular orientation of the first and second disc blades of the disc blade assemblies. This on-the-go angle adjustable capability of the disc blades enables the farmer to vary the amount of crop residue left on the surface of the soil.

The main frame of the tillage implement may further support a plurality of deep tillage shanks. Each of the shanks are positioned rearwardly and longitudinally in line with one of the plurality of disc blade assemblies of the disc gang. Positioning the disc blade assemblies forwardly and in line with the deep till shanks prevents plugging of the shanks because the disc blades cut the crop residue and throw it out of the way of the deep till shanks.

Therefore it is an object of the present invention to provide an improved tillage implement;

It is another object of the present invention to provide a tillage implement that enables disc blades on the implement to be adjusted while on-the-go in order to adjust the percentage of crop residue left on the surface of the soil.

It is another object of the present invention to provide an improved deep tillage implement;

It is another object of the present invention to provide an improved deep tillage implement for use in high crop residue fields;

It is another object of the present invention to provide a deep tillage implement with improved crop residue flow-through to minimize plugging of its deep till shanks; and Other objects, advantages, and novel features of the present invention will become apparent from the following detailed description of the invention when considered in conjunction with the accompanying drawings.

DETAILED DESCRIPTION OF THE INVENTION

Figure 1:
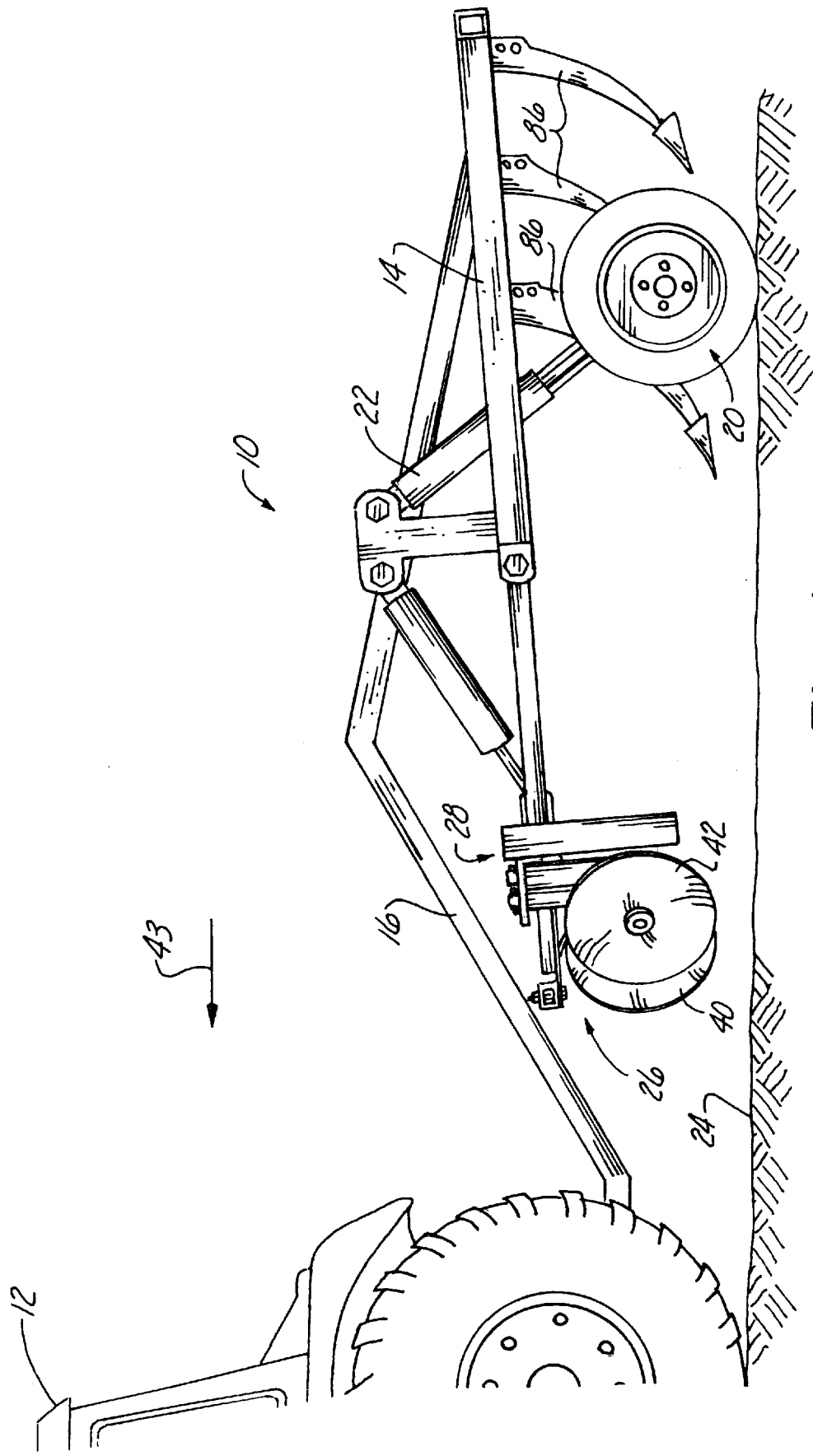
FIG. 1 is a side elevation view of a deep tillage implement of the present invention in transport position.

Referring now to the drawings, wherein like reference numerals designate identical or corresponding parts throughout the several views, FIG. 1 shows a side elevation view of the deep tillage implement of the present invention depicted generally at (10). The deep tillage implement (10) is shown in transport position being towed behind a tractor (12). The implement (10) is comprised of a main frame (14) adapted to be towed by a tractor (12). The main frame (14) includes a tongue (16) for attachment to the drawbar (18) of the tractor (12) (see also FIG. 3).

Figure 2:
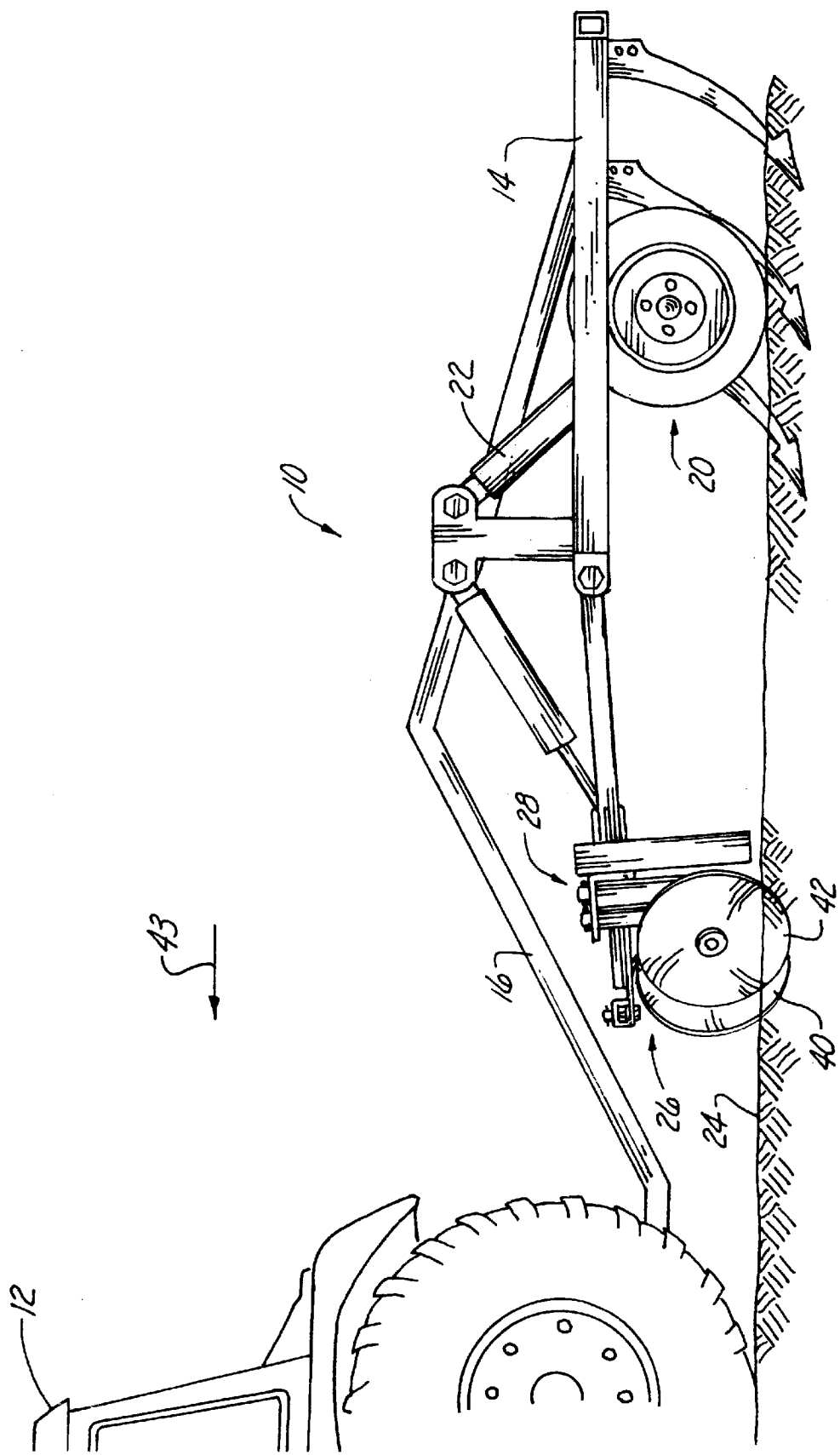
FIG. 2 is a side elevation view of the deep tillage implement of FIG. 1 in working position.

The implement (10) further includes a pair of ground wheel assemblies (20) which are pivotally attached to the main frame (14). A first actuator (22), such as a hydraulic cylinder, is operably connected to each ground wheel assembly (20) and to the main frame (14). The first actuator (22) acts to pivot the ground wheel assemblies (20) with respect to the main frame (14), thereby raising and lowering the main frame (14) with respect to the ground surface (24) between the transport position (FIG. 1) and the working position (FIG. 2).

The tillage implement (10) further comprises a plurality of disc blade assemblies (26). The plurality of disc blade assemblies (26) are arranged as a disc gang (28) (best viewed in FIG. 3). The disc gang (28) is comprised of a disc gang support beam (30) to which is attached the disc blade assemblies (26) (discussed later). The disc gang (28) is pivotally connected to the main frame (14) by disc gang support brackets (32) fixed at one end to the disc gang support beam (30) and pinned at its other end by pins (34) received by connecting lugs (36) fixed to the main frame (14). A second pair of actuators (38) connected at one end to the main frame (14) and at another end to the disc gang support beam (30) act to pivotally raise and lower the disc gang (28) with respect to the main frame (14), thereby changing the working depth of the disc blades (40 and 42) (see FIG. 2).

Figure 3:
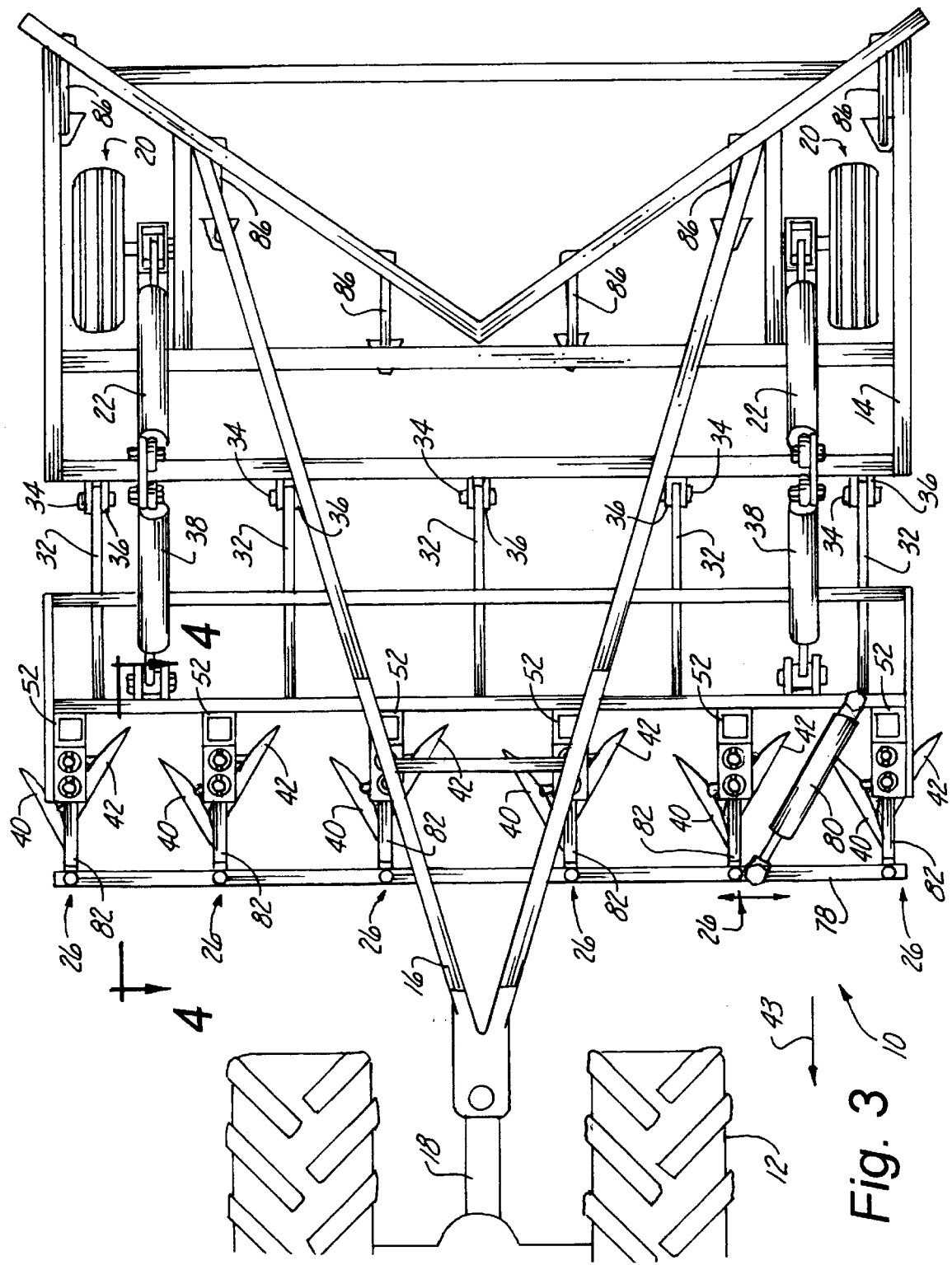
FIG. 3 is a top plan view of the deep tillage implement of FIG. 2.
Figure 4:
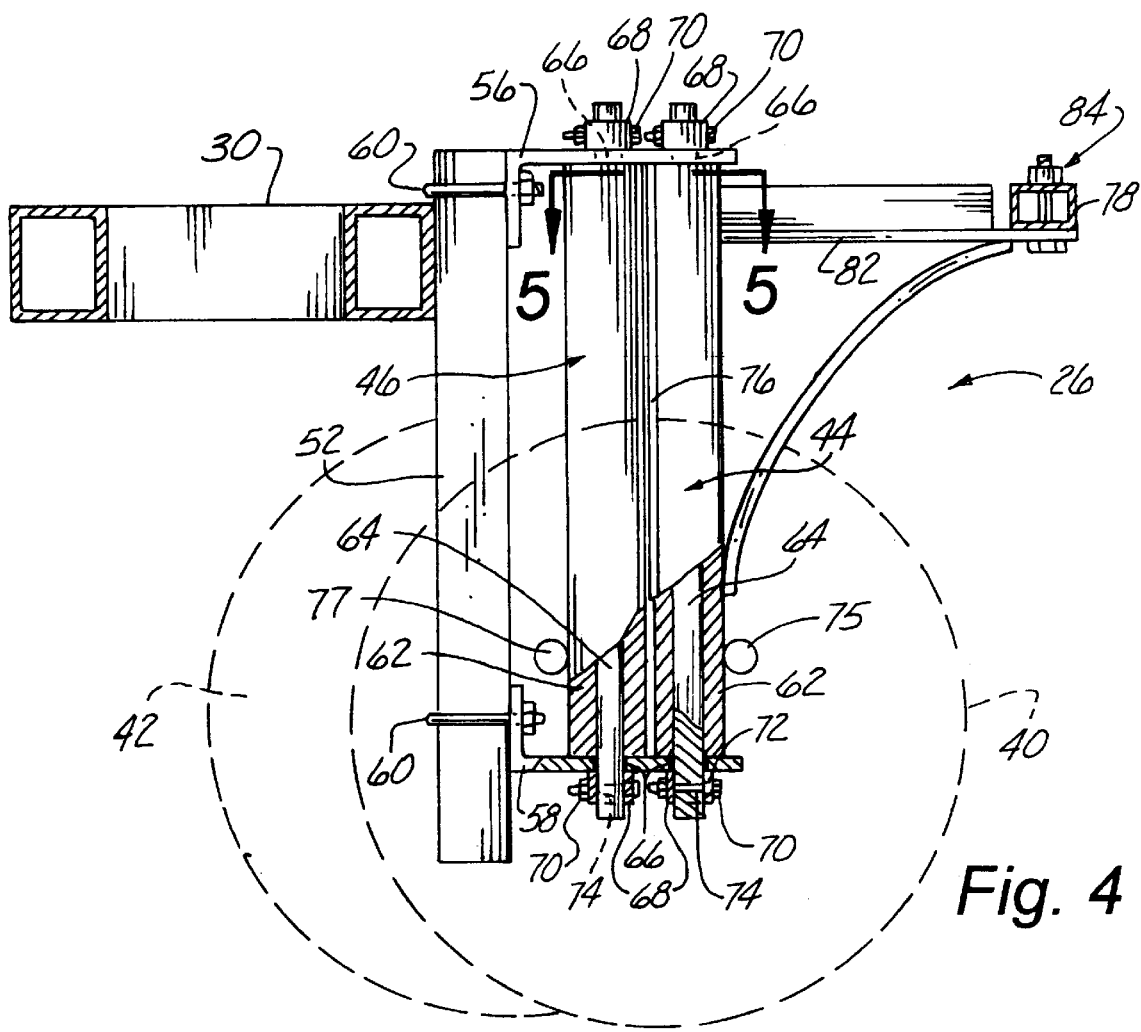
FIG. 4 is a side elevation view of the disc blade assembly of the present invention as viewed along lines 4—4 of FIG. 3.
Figure 5:
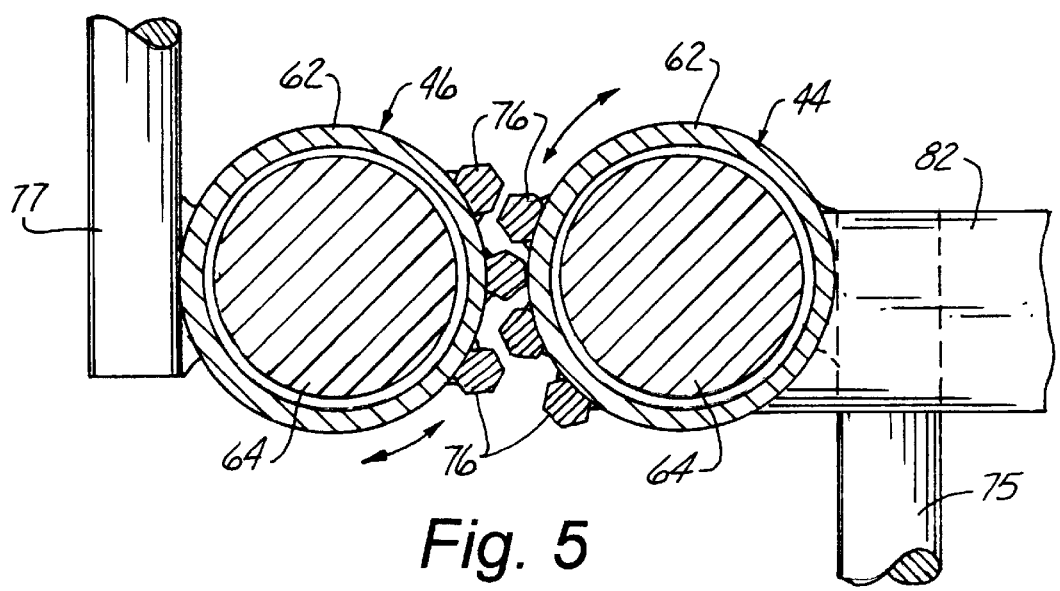
FIG. 5 is a cross-sectional view of the interlocking members of the disc blade assembly of the present invention as viewed along lines 5—5 of FIG. 4.
Figure 6:
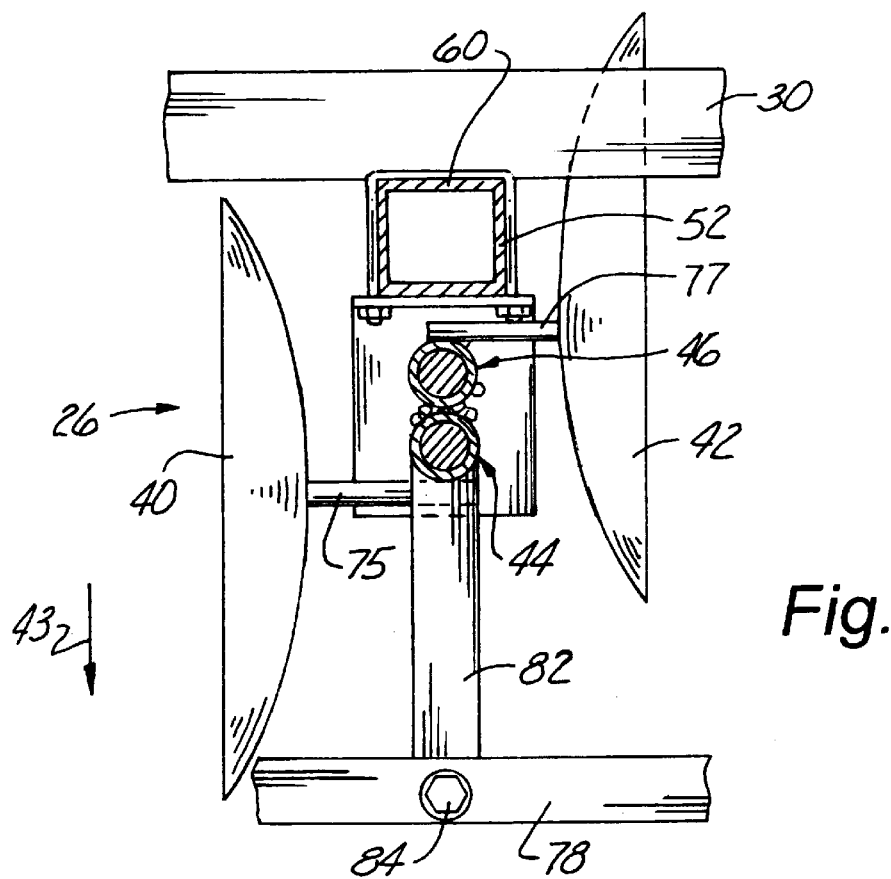
FIG. 6 is a partial cross-sectional top plan view of the disc blade assembly of the present invention with the disc blades oriented substantially in line with the direction of travel of the implement.
Figure 7:
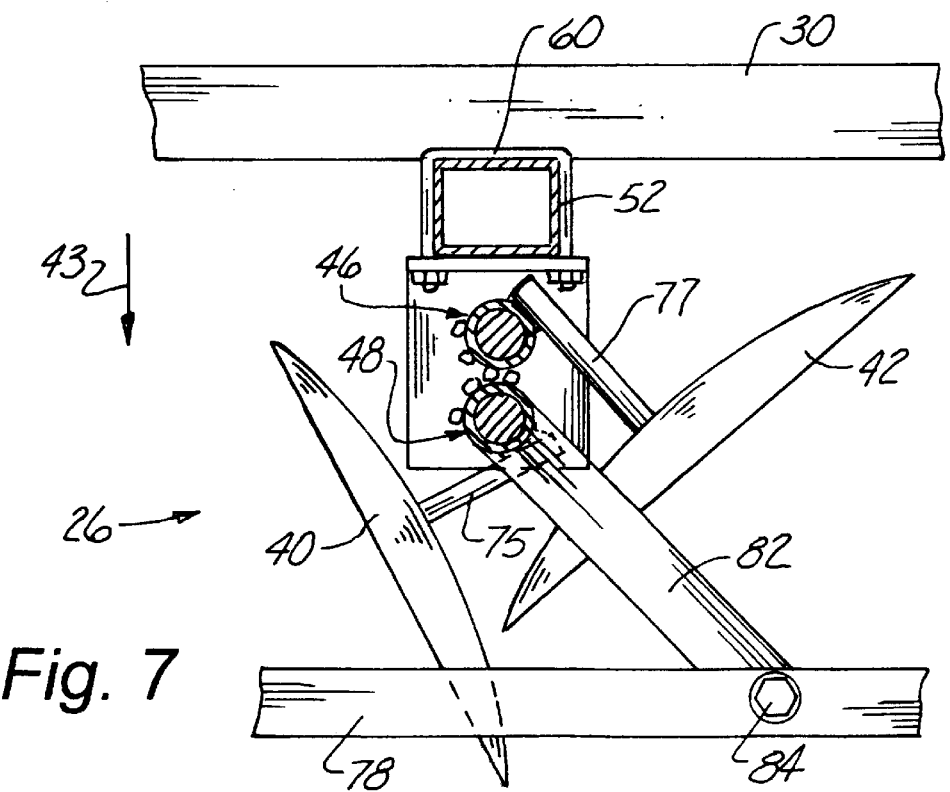
FIG. 7 is a partial cross-sectional top plan view of the disc blade assembly of FIG. 6 with the disc blades adjusted oblique to the direction of travel of the implement.

Each of the disc blade assemblies (26) of the disc gang (28) has first and second disc blades (40 and 42) that are angularly adjustable relative to one another and to the direction of travel (as designated by arrows (43)) of the tractor (12) and implement (10) (see FIGS. 6 and 7). The angular adjustment of the disc blades (40 and 42) is accomplished by first and second interlocking members (44 and 46) (best viewed in FIGS. 4 and 5) which are in working relationship with a transverse bar (48) and a third hydraulic cylinder (50) (FIG. 3). FIG. 4 is a side elevation view of the disc blade assembly (26) as viewed along lines 4—4 of FIG. 3. FIG. 5 is a cross-sectional view of the interlocking members (44 and 46) as viewed along lines 5—5 of FIG. 4. As seen in FIG. 4, a disc blade assembly support (52) is secured to the disc gang support beam (30). The interlocking members (44 and 46) are disposed between upper and lower brackets (56 and 58) that are secured to the vertical support member (52) by U-bolts (60). Each of the interlocking members (44 and 46) are preferably thick walled pipe sleeves (62) which surround a shaft (64). The shafts (64)

project through apertures (66) in the upper and lower brackets (56 and 58). Bushings (68) are secured to the upper and lower brackets (56 and 58) for receiving the ends of the shafts (64) projecting therethrough. A threaded fastener (70) extends through apertures (72) in the bushings (68) and apertures (74) in the shaft (64), thereby securing the shaft (64) within the bushings (68). Thus, it should be appreciated that the sleeves (62) of the interlocking members (44 and 46) are free to rotate about the fixed shafts (64).

First and second disc blade axles (75 and 77) are rigidly fixed to the first and second interlocking members (44 and 46), preferably by welding, as shown in FIGS. 4 and 5. The disc blade axles (75 and 77) rotatably receive first and second disc blades (40 and 42) in the conventional manner.

As best viewed in FIG. 5, hex shaped rods (76) are welded to the lengths of opposing outer peripheries of the sleeves (62) of the interlocking members (44 and 46) such that the rods (76) are disposed in interlocking engagement. It will be appreciated that rotation of the first interlocking member (44) will cause subsequent rotation of the second interlocking member (46) due to the interlocking engagement of the opposing rods (76) (see FIGS. 6 and 7).

Referring now to FIG. 3 in conjunction with FIG. 4, it can be seen that a transverse bar (78) extends the width of the implement (10). The third actuator (50) (FIG. 3) is connected at one end to the disc gang support beam (30) (thus operably to the main frame (14)) and at its other end to the transverse bar (78). Linking members (82) pivotally connect the transverse bar (78) to the first interlocking member (44). As best viewed in FIG. 4, a pinned connection (84) pivotally secures the transverse bar (78) to the linking member (82). Actuation of the third actuator (50) acts to move the transverse bar (78) transverse to the direction of travel of the implement (10) (designated by arrow (43)), thereby causing rotation of the first and second interlocking members (44 and 46) connected thereto by the link (82), thereby changing the angular orientation of the first and second disc blades (40 and 42) (see FIGS. 6 and 7) of the disc blade assemblies (26).

Figure 8:
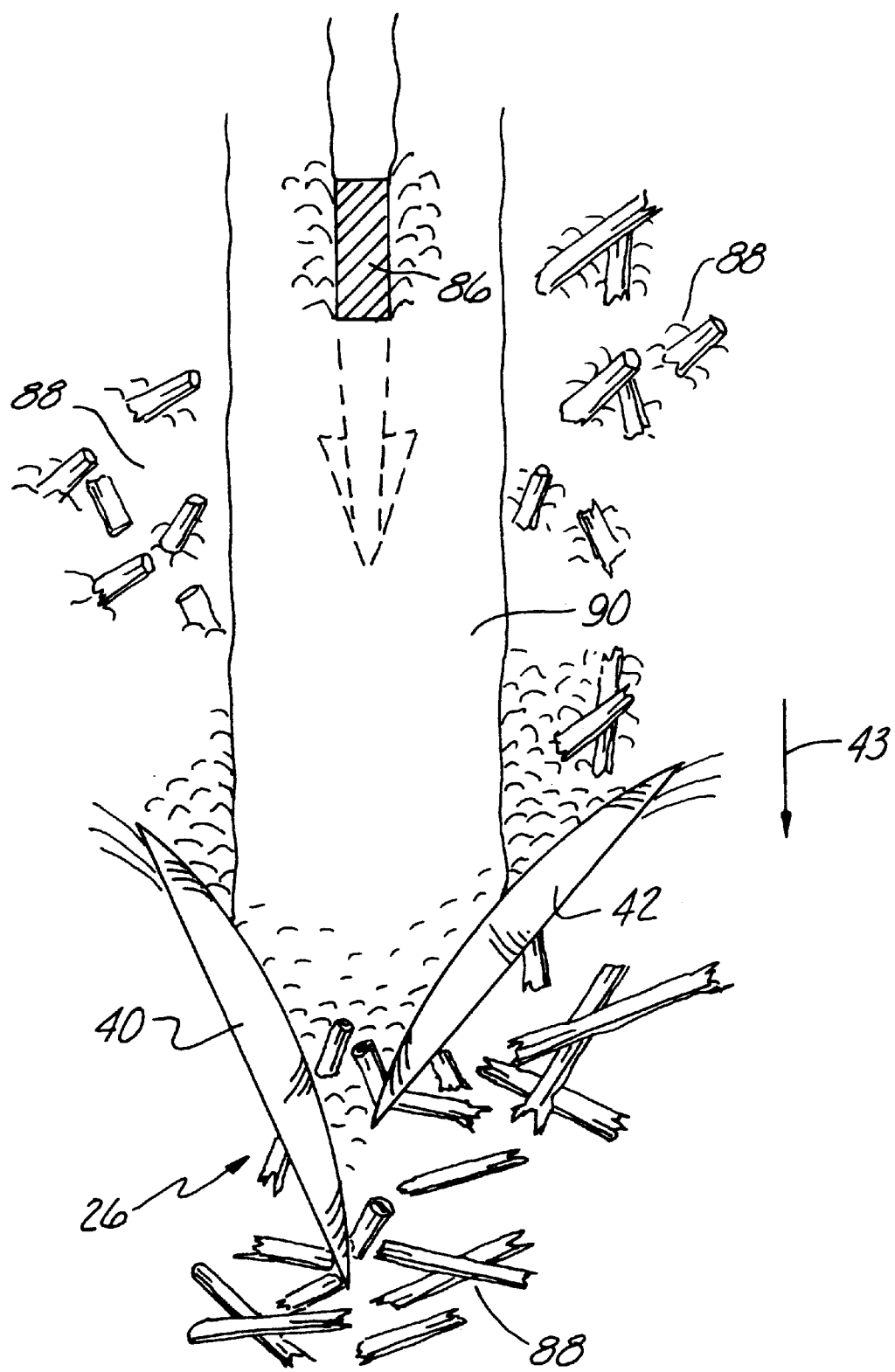
FIG. 8 is a schematic illustration of the disc blades and deep tillage shank in working operation.

The main frame (14) of the tillage implement (10) may further support a plurality of deep tillage shanks (86) preferably arranged in a V-shaped formation for easier pulling and maximum crop residue flow-through. Each of the shanks (86) are positioned rearwardly and longitudinally in line with one of the plurality of disc blade assemblies (26) of the disc gang (28). As illustrated in FIG. 8, positioning the deep till shanks (86) rearwardly and longitudinally in line with the disc blade assemblies (26) prevents plugging of the shanks (86) because the disc blades (40 and 42) cut and chop the crop residue (88) creating a substantially clean shallow trench (90) by throwing the crop residue (88) out of the way of the deep till shanks (86) as the implement (10) traverses the field.

In operation, the implement (10) is lowered from the transport position (FIG. 1) to the working position (FIG. 2), by actuation of the first hydraulic cylinders (22). The depth of penetration of the deep till shanks (86) into the soil surface (24) is thereby controlled by the lowering of the main frame (14) with the first hydraulic cylinder (22). The depth of penetration of the disc blades (40 and 42) into the soil surface (24) is further controlled by actuation of the second hydraulic cylinders (38) wich acts to pivotally raise and lower the entire disc gang (28) with respect to the main frame (14) about pivot pins (34). Depending on the percentage of crop residue (88) and the soil conditions of the field, the angular orientation of the disc blades (40 and 42) can be changed from a substantially in line position with the direction of travel as shown in FIG. 6 to an extreme oblique angle from the direction of travel as shown in FIG. 7 while on-the-go by actuation of the third hydraulic cylinder (50). It should be appreciated that altering the oblique angle of the disc blades (40 and 42) while the implement (10) is in working position and on-the-go, enables the farmer to vary the amount of crop residue left on the surface of the soil as field conditions and crop residue requirements change.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A tillage implement, comprising:
   a main frame; and
   a plurality of disc blade assemblies operably supported by said main frames, each of said plurality of disc blade assemblies having first and second rotatable interlocking members, said first rotatable interlocking member having a first disc blade rotatably connected thereto, said second rotatable interlocking member having a second disc blade rotatably connected thereto, said first and second disc blades having an angular orientation relative to one another, whereby rotation of said first and second interlocking members enables angular adjustment of said disc blades relative to one another and to the direction of travel of the implement while on-the-go.

2. The tillage implement of claim 1 further comprising:
   a ground wheel assembly pivotally attached to said main frame; and
   a first actuator operably connected to said ground wheel assembly and said main frame for pivotally raising and lowering said ground wheel assembly with respect to said main frame, thereby raising and lowering said implement with respect to the ground surface.

3. The tillage implement of claim 2 wherein said plurality of disc blade assemblies are arranged as a disc gang, said disc gang being operably and pivotally connected to said main frame and wherein said tillage implement further comprises a second actuator for pivotally raising and lowering said disc gang with respect to said main frame.

4. The tillage implement of claim 3 further comprising:
   a transverse bar extending substantially transverse to the direction of travel of the implement;
   linking members operably connecting said transverse bar to one of said interlocking members of each disc blade assembly of said disc gang; and
   a third actuator operably connected at one end to said main frame and at another end to said transverse bar, whereby activation of said third actuator causes movement of said transverse bar transverse to the direction of travel of said tractor and implement, thereby causing rotation of said first and second interlocking members, thereby changing the angular orientation of said first and second disc blades of said disc blade assemblies.

5. The tillage implement of claim 4 wherein said main frame further supports a plurality of deep tillage shanks, each of said shanks being positioned rearwardly and longitudinally in line with one of said plurality of disc blade assemblies of said disc gang.

6. The tillage implement of claim 1 wherein said tillage implement is adapted to be towed by a tractor.

7. The tillage implement of claim 1 wherein said tillage implement is adapted to be mounted on a tractor.

8. The tillage implement of claim 1 wherein said tillage implement is adapted to attach to tractor's three-point hitch.

9. The tillage implement of claim 1 wherein said tillage implement is self propelled.

10. A tillage implement with on-the-go disc angle adjustment, comprising:

a main frame;

a plurality of disc blade assemblies operably supported by said main frame, each of said disc blade assemblies having first and second disc blades, said disc blades having an angular orientation and wherein said disc blades are, angularly adjustable relative to one another and to the direction of travel of the implement, said disc blade assemblies including first and second interlocking members operably and rotatably mounted to said main frame of said tillage implement, said disc blade assemblies further comprising first and second disc blade axles for rotatably receiving said first and second disc blades, said disc blade axles being operably fixed to said interlocking members, said disc blade assemblies being arranged as a disc gang;

a around wheel assembly pivotally attached to said main frame;

a first actuator operably connected to said ground wheel assembly and said main frame for pivotally raising and lowering said ground wheel assembly with respect to said main frame, thereby raising and lowering said implement with respect to the ground surface;

a second actuator for pivotally raising and lowering said disc gang with respect to said main frame;

a transverse bar extending substantially transverse to the direction of travel of said implement;

linking members operably connecting said bar to one of said interlocking members of each disc blade assembly of said disc gang; and a third actuator operably connected at one end to said main frame and at another end to said bar, whereby activation of said third actuator causes movement of said transverse bar transverse to the direction of travel of said tractor and implement, thereby causing rotation of said first and second interlocking members, thereby changing the angular orientation of said first and second disc blades of said disc blade assemblies.

11. A tillage implement to improve crop yield by reducing soil compaction, said tillage implement comprising:

a main frame;

a plurality of disc blade assemblies operably supported by said main frame, each of said disc blade assemblies having first and second disc blades, said disc blades having an angular orientation and wherein aid disc blades are angularly adjustable relative to one another and to the direction of travel of the implement, said disc blade assemblies including first and second interlocking members operably and rotatably mounted to said main frame of said tillage implement, said disc blade assemblies further comprising first and second disc blade axles for rotatably receiving said first and second disc blades, said disc blade axles being operably fixed to said interlocking members, said disc blade assemblies being arranged as a disc gang;

a ground wheel assembly pivotally attached to said main frame;

a first actuator operably connected to said ground wheel assembly and said main frame for pivotally raising and lowering said ground wheel assembly with respect to said main frame, thereby raising and lowering said implement with respect to the ground surface;

a second actuator for pivotally raising and lowering said disc gang with respect to said main frame;

a transverse bar extending substantially transverse to the direction of travel of said implement;

linking members operably connecting said transverse bar to one of said interlocking members of each disc blade assembly of said disc gang;

a third actuator operably connected at one end to said main frame and at another end to said transverse bar, whereby activation of said third actuator causes movement of said transverse bar transverse to the direction of travel of said tractor and implement, thereby causing rotation of said first and second interlocking members, thereby changing the angular orientation of said first and second disc blades of said disc blade assemblies; and a plurality of deep tillage shanks operably supported by said main frame, each of said shanks being positioned rearwardly and longitudinally in line with one of said plurality of disc blade assemblies of said disc gang.

12. A tillage tool assembly for a tillage implement, said tillage tool assembly comprising:

first and second disc blades each having an angular orientation and wherein said angular orientations are adjustable relative to one another;

first and second rotatable interlocking members, said first rotatable interlocking member having said first disc blade rotatably connected thereto, said second rotatable interlocking member having said second disc blade rotatably connected thereto, whereby rotation of said first and second interlocking members enables on-the-go angular adjustment of said first and second disc blades relative to one another; and brackets for positionally securing said first and second rotatable interlocking members in rotatable interlocking relation.

13. The tillage tool assembly of claim 12 wherein said first and second rotatable interlocking members comprise:

a first elongated, vertically oriented shaft;

a second elongated, vertically oriented shaft spaced in aft relation to said first elongated shaft;

a first elongated sleeve disposed over said first elongated shaft, said first elongated sleeve having an outer periphery with projections extending radially outward on at least a portion thereof and extending at least a portion of the length thereof;

a second elongated sleeve disposed over said second elongated shaft, said second elongated sleeve having an outer periphery with projections extending radially outward on at least a portion thereof and extending at least a portion of the length thereof, said radial projections on said first and second sleeves disposed in interlocking relation.

\* \* \* \* \*

UNITED STATES PATENT AND TRADEMARK OFFICE
CERTIFICATE OF CORRECTION

PATENT NO. : 5,915,481
DATED : June 29, 1999
INVENTOR(S) : Kevin P. Flenker et al.

It is certified that error appears in the above-identified patent and that said Letters Patent is hereby corrected as shown below:

On the title page: Item [76] "William Flenker" should be -- William P. Flenker --.

At Column 4, Lines 56 and 57 of the Letters Patent, "third hydraulic cylinder (50)" should be -- third actuator (50), such as a hydraulic cylinder --.

In Claim 10, at Column 7, Line 24 of the Letters Patent, "around" should be -- ground --.

In Claim 11, at Column 7, Line 54 of the Letters Patent, "aid" should be -- said --.

Signed and Sealed this

Twenty-third Day of May, 2000

Attest:

Q. TODD DICKINSON

*Attesting Officer*     *Director of Patents and Trademarks*